Oct. 21, 1930.  A. W. MOSELEY  1,778,865
VALVE
Filed Feb. 12, 1923

Inventor,
Alexander W. Moseley
By Parker & Carter Attys.

Patented Oct. 21, 1930

1,778,865

UNITED STATES PATENT OFFICE

ALEXANDER W. MOSELEY, OF EVANSTON, ILLINOIS, ASSIGNOR TO SLOAN VALVE COMPANY, OF CHICAGO, ILLINOIS, A CORPORATION OF ILLINOIS

VALVE

Application filed February 12, 1923. Serial No. 618,656.

This invention relates to valves and has for its object to provide a new and improved valve of this description. The ordinary plug valve often sticks or "freezes", thus making it impossible or difficult to turn the valve to open it. The present invention has among other objects to provide a valve which will not stick and which can be easily and quickly opened. The invention has other objects which are more particularly pointed out in the following description.

Referring now to the drawings.

Like numerals refer to like parts throughout the several figures.

Figure 1:
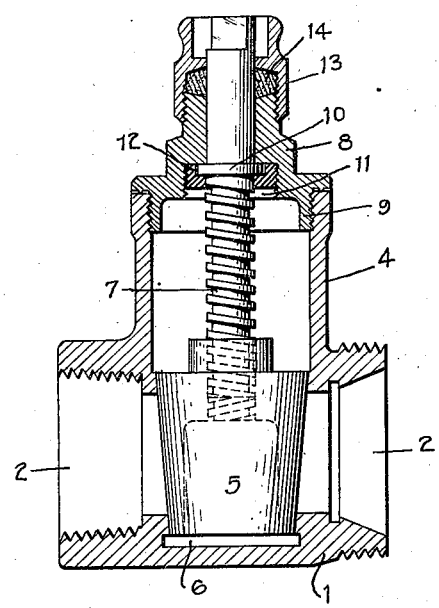
Fig. 1 is a sectional view taken on line 1—1 of Fig. 2 showing one form of valve embodying the invention.

Referring now to the drawings, I have shown a construction wherein there is a valve casing 1 having a passageway 2 extending therethrough. Connected with the casing is a hollow cylindrical portion 4 which is preferably at right angles to the casing 1. The casing 1 has a conical seat which is concentric with the hollow cylindrical portion. Located within the casing 1 is a closing piece 5 which is preferably a hollow cylindrical closing piece, and I have shown it in the form of a truncated cone. This closing piece fits the conical seat and extends across the passageway through the casing when in its closed position, the end thereof projecting into a recess 6 in the bottom of the valve casing. In the top of the closing piece is a threaded opening in which works a threaded stem 7, the closing piece 5 provided at its top with a cylindrical projection smaller in diameter than the closing piece, which is also provided with a threaded opening. The recess 6 is larger in cross section than the end of the closing piece 5 as shown in Fig. 1. The hollow portion 4 has a cover 8 which has a threaded portion 9 which engages threads in the hollow portion 4. The cover 8 is provided with an opening through which the stem 7 passes. This stem has an annular shoulder 10 which engages the cover 8 so as to prevent the stem from moving longitudinally or axially. The cover 8 has a recess 11 in which fits the threaded packing piece 12, said packing piece having a recess for the annular shoulder 10. A packing cup 13 is threaded to the top of the cover 8, there being suitable packing 14 in the space between the cup 13 and the cover 8 and surrounding the stem.

Figure 2:
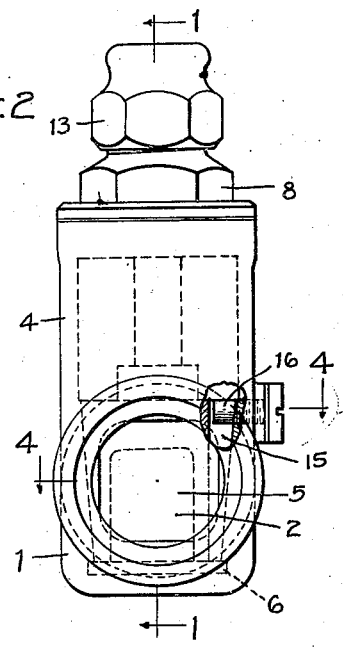
Fig. 2 is an end elevation of the valve shown in Fig. 1 with parts broken away.
Figure 3:
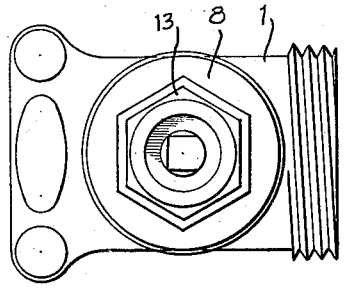
Fig. 3 is a plan view of the valve shown in Fig. 2.
Figure 4:
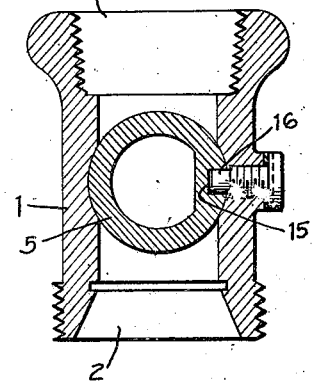
Fig. 4 is a sectional view taken on line 4—4 of Fig. 2.

The stem 7 is provided at the top with some means for turning it. As herein shown, this stem is arranged for a particular wrench or handle by having three flat sides and one curved side as shown in Fig. 3. Any other suitable means may be used, such as the ordinary valve handle. The closing piece 5 is provided with a groove 15 (see Figs. 2 and 4). This groove preferably extends the length thereof. Projecting into this groove is a holding piece 16 which permits the closing piece to be moved axially but prevents its rotation. In the particular construction shown, this holding piece is a screw.

Means is provided for preventing the locking of the closing piece 5 by the screw 16, and for also preventing the engagement of the screw 16 with the bottom of the groove 15 so as to exert pressure thereon and make it difficult to open and close the closing piece. In the particular construction shown two means for accomplishing this are provided. One consists in making the end of the screw 15 smaller than the body thereof, the enlarged threaded portion engaging shoulders on the casing 1 so as to stop the screw before pressure is exerted on the bottom of the groove, and the other consists of the head of the screw engaging the casing 1, or in this particular instance a washer, the casing having a projection, as clearly shown in Figs. 2 and 3, for the engagement of the head of the screw.

In the operation of the valve when the stem 7 is rotated in one direction the closing piece 5 is lifted by the thread of the stem 7 working in the thread of the closing piece, the holding device 16 preventing rotation of the closing piece. Since the closing piece has an inclined or conical shaped face and has its large end upward it lifts easily and there can be no sticking. When it is desired to close the closing piece, the stem is rotated in the opposite direction and the closing piece is moved down to the closed position shown in Fig. 1 or to any intermediate position.

I have described in detail a particular construction embodying the invention but it is of course evident that the parts may be varied in many particulars without departing from the spirit of the invention as embodied in the claim hereto appended and I therefore do not limit myself to the particular construction shown.

I claim:

A valve comprising a casing having an opening therethrough, a closing piece in said casing for controlling said opening, a screw threaded stem working in a threaded opening in said closing piece, a groove extending longitudinally along said closing piece, the casing being provided with a hole opposite said groove, a holding piece in said hole, said holding piece having one end smaller in diameter than the body portion so as to provide a shoulder intermediate the ends of the holding piece, said end projecting into said groove, the inner portion of the hole in said casing being smaller in diameter than the remaining portion of said hole so as to form a shoulder which is engaged by a shoulder on the holding piece to prevent the holding piece from engaging the closing piece so as to interfere with its movement.

Signed at Chicago, county of Cook, and State of Illinois, this 28th day of January, 1923.

ALEXANDER W. MOSELEY.